United States Patent [19]

Sutter et al.

[11] Patent Number: 5,089,579
[45] Date of Patent: Feb. 18, 1992

[54] PROCESS FOR THE PRODUCTION OF ETHYLENE-VINYL ACETATE COPOLYMERS, NEW ETHYLENE/VINYL ACETATE COPOLYMERS AND THEIR USE

[75] Inventors: Hubert Sutter, Leverkusen; Alois Kolwert, Roesrath; Werner Obrecht, Moers, all of Fed. Rep. of Germany

[73] Assignee: Bayer Aktiengesellschaft, Leverkusen-Bayerwerk, Fed. Rep. of Germany

[21] Appl. No.: 448,543

[22] Filed: Dec. 11, 1989

[30] Foreign Application Priority Data

Dec. 23, 1988 [DE] Fed. Rep. of Germany ....... 3843562

[51] Int. Cl.⁵ ............................................. C08F 20/10
[52] U.S. Cl. ................................... 526/323.2; 526/331
[58] Field of Search ............................. 526/323.2, 331

[56] References Cited

U.S. PATENT DOCUMENTS

| 3,755,237 | 8/1973 | Isaacs et al. | 526/331 |
| 4,073,779 | 2/1978 | Wiest et al. | 526/331 |
| 4,078,136 | 3/1978 | Pietschmann et al. | 526/331 |
| 4,515,931 | 5/1985 | Olson et al. | 526/323.2 |
| 4,803,252 | 2/1989 | Kida et al. | 526/323.2 |

FOREIGN PATENT DOCUMENTS

| 0064242 | 6/1978 | Japan | 526/323.2 |
| 2059612 | 3/1987 | Japan | 526/323.2 |
| 2059613 | 3/1987 | Japan | 526/323.2 |

*Primary Examiner*—Joseph L. Schofer
*Assistant Examiner*—Jeffrey T. Smith
*Attorney, Agent, or Firm*—Connolly and Hutz

[57] ABSTRACT

Ethylene/vinyl acetate high-pressure bulk polymers having reduced tackiness can be produced by copolymerization of small quantities of an acryloyl or methacryloyl compound.

2 Claims, No Drawings

PROCESS FOR THE PRODUCTION OF ETHYLENE-VINYL ACETATE COPOLYMERS, NEW ETHYLENE/VINYL ACETATE COPOLYMERS AND THEIR USE

This invention relates to a process for the production of ethylene/vinyl acetate copolymers (EVA) using certain comonomers by high-pressure polymerization, to new ethylene/vinyl acetate copolymers containing copolymerized units of these comonomers and to the use of these copolymers as flow promoters, as adhesive binders, as a mixture component for thermoplastics and duroplastics and for the production of vulcanizates.

It is known that ethylene and vinyl acetate can be radically copolymerized in different quantitative ratios with statistical distribution of the monomers. Where they have a low vinyl acetate content, the copolymers show the crystallinity typical of polyethylene at room temperature and, due to relatively long ethylene sequences, are thermoplastic in character [cf. H. Bartl, J. Peter, "Über Ethylen/Vinylacetat-Copolymerisate und ihre Vernetzung", Kautschuk und Gummi 14, WT 23-WT 32 (1961); Winnacker-Küchler, Chem. Technologie, Vol. 6, 4th Edition, Chapter 2.2.7 (Ethylen-Vinylacetat-Copolymere", Carl Hanser Verlag, München-Wien, 1982, pages 570 - 572; M. Arne, R.H. Schwar, Report No. 155, Ethylene Copolymers, Process Economics Program, Menlo Park, Calif., pages 1-40 (1983)].

The copolymerization may be carried out by the following three methods:
1. Emulsion polymerization,
2. Solution polymerization and
3. High-pressure polymerization The production of EVA by emulsion polymerization is described in DE-OS 3 000 009. products containing from 40 to 70% by weight copolymerized vinyl acetate are also obtained by this process. The products contain residues of emulsifier which cannot be completely removed. Therefore these polymers are unsuitable for many applications.

The production of EVA containing more than 75% by weight vinyl acetate by emulsion polymerization is also known. Medium-pressure processes carried out at pressures of 30 to 500 bar and at temperatures of 20° to 100° C. are typical. The copolymers thus obtained have high gel contents and cannot be processed as solid rubber for most purposes. Accordingly, these polymers are generally not isolated at all, instead the aqueous solids dispersion (latex) is directly applied.

In the solution polymerization process for the production of EVA, very little freedom of choice is available because the production of gel-free products requires, on the one hand, good solubility of the products throughout the polymerization process and, on the other hand, a low transfer constant of the solvent to the growing polymer chain. Accordingly, tert.-butanol or mixtures of tert.butanol, methanol and hydrocarbons for example are used as solvent in the solution polymerization process for the production of EVA containing more than 30% by weight vinyl acetate (cf. U.S. Pat. No. 2,396,785, DE-ASS 1 126 614 and 1 126 613, FR-PS 1 189 387 and U.S. Pat No. 2,947,735; GB-PSS 807,112 and 843,974; FR-PSS 1 238 589 and 1 225 704 and DE-OS 3 323 531). In addition, for the economic production of EVA, the polymerization has to be carried out at high solids concentrations at which considerable viscosities are developed. Products containing up to 75% by weight vinyl acetate can be obtained by solution polymerization (DE-AS 1 495 767).

EVA of low vinyl acetate content can be produced by high-pressure bulk polymerization (H. Bucka, R. Nitzsche, H. Onderka, Plaste und Kautschuk 30, 6, pages 302-305 (1983)). The polymerization is generally carried out under pressures of 1,000 to 3,000 bar and at temperatures of 150° to 280° C. Products produced by this process, which have vinyl acetate contents of up to 30% by weight, may be used as hotmelt adhesives and as flow promoters for crude oils and middle distillates and for the sheathing of cables.

EVA high-pressure bulk polymers have hitherto been partly barred from applications for products containing more than 30% by weight vinyl acetate because, in the high pressure bulk polymerization of ethylene and vinyl acetate, the tackiness of the products increases with increasing vinyl acetate content. The tackiness of the products is problematical in the production process, particularly in discharge units and during granulation. In the storage of tacky granulates, caking and blockages are common and, in the processing of tacky materials, difficulties are encountered in metering and mixing units.

Accordingly, the object of the present invention is to produce EVA of reduced tackiness with vinyl acetate contents of 30 to 80% by weight by the high-pressure bulk polymerization process. The copolymers obtained should preferably be substantially free from gelled components.

It has now surprisingly been found that the object of the invention as stated above can be effectively achieved by copolymerization of small quantities of compounds containing at least two acryloyl or methacryloyl groups. Although there is definitely a causal relationship between the process according to the invention and reduced tackiness, it has not yet been elucidated. At all events, it may be assumed that the reduced tackiness is not attributable solely to an increase in molecular weight because the copolymerization of other polyfunctional comonomers of the type generally used for crosslinking and hence for increasing molecular weight (for example divinyl benzene, triallyl cyanurate, diallyl phthalate, triallyl phosphate), does not have a significantly positive effect in the sense of reduced tackiness.

Accordingly, the present invention relates to a process for the production of ethylene/vinyl acetate copolymers containing from 30 to 80% by weight copolymerized vinyl acetate by bulk polymerization of the monomers by the high-pressure method under pressures of 500 to 5,000 bar and preferably under pressures of 1,000 to 3,000 bar, characterized in that the polymerization is carried out in the presence of from 50 ppm to 2% by weight and preferably in the presence of from 100 ppm to 1% by weight, based on polymerizable monomers used, of a (meth)acryloyl compound containing at least two acryloyl or methacryloyl groups per molecule.

Preferred (meth)acryloyl compounds for the process according to the invention are compounds having a molecular weight in the range from 126 to 1,000 and preferably in the range from 126 to 500, for example acrylic,anhydride, methacrylic anhydride, the acrylates and methacrylates of polyhydric, more especially dihydric and trihydric, aliphatic, cycloaliphatic, araliphatic and aromatic alcohols containing 2 to 24 carbon atoms per molecule, i.e. for example acrylates and methacrylates of ethylene glycol, propane1,2- and -1,3-diol, butane-1,2-, -1,3-, -2,3- and -1,4-diol, neopentyl glycol, hexane diols, particularly hexane1,6-diol, cyclohexane-1,4-diol, 1,4-bis-(hydroxymethyl)cyclohexane, hydroquinone, resorcinol, bisphenol A, ethoxylated bisphenol A, hydroquinone di-(β-hydroxyethyl)ether; of glycerol, trimethylol ethane and propane, phloroglucinol.

Other preferred (meth)acryloyl compounds are acrylates and methacrylates of polyether polyols, preferably of polyethylene and polypropylene glycols containing 1 to 20 and preferably 1 to 12 ether oxygen atoms per molecule; more especially acrylates and methacrylates of diethylene and triethylene glycol and of dipropylene and tripropylene glycol.

In addition to the (meth)acryloyl compounds to be used in accordance with the invention, up to 10% by weight of the sum total of monomers to be used, namely ethylene and vinyl acetate, may be replaced by other comonomers. Preferred examples of such comonomers are carbon monoxide and, above all, compounds which, in addition to a copolymerizable C=C double bond, also contain a reactive group which remains in the polymer chain during incorporation of the monomer and enables the copolymer obtained to be vulcanized with various vulcanizing agents. Comonomers such as these containing reactive groups are, for example, compounds corresponding to the following formula

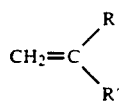

in which
R=H, CH₃ and
R'=—COOH, —CONH₂, —COOCH₂OH,

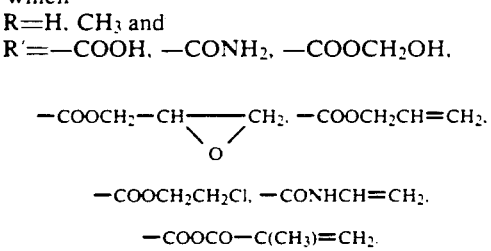

—COOCH₂CH₂Cl, —CONHCH=CH₂,

—COOCO—C(CH₃)=CH₂.

The process according to the invention may be carried out at temperatures in the range from 50° to 450° C. and preferably at temperatures in the range from 100° to 350° C.

The process according to the invention may be initiated by radical-forming compounds. Suitable polymerization initiators include those compounds which are also used for the high-pressure homopolymerization of ethylene. Oxygen for example is suitable, preferably being used in quantities of from 10 to 1,000 mol-ppm, based on monomers to be polymerized. Other polymerization initiators are, for example, peroxides, hydroperoxides and mixtures thereof, but above all mixtures of oxygen and peroxides and/or hydroperoxides. Preferred peroxides and hydroperoxides include tert.-butyl perpivalate, di-tert.butyl peroxide, tert.-butyl hydroperoxide, tert.-butyl perbenzoate, dilauroyl peroxide, tert.-butyl perisooctanoate and tert.-butyl perisononanoate. The peroxides di-tert.-butyl peroxide, tert.-butyl perpivalate and tert.butyl perisononanoate are particularly suitable.

The concentration in which the initiator is added is generally in the range from 0.001 to 100 mol-ppm and preferably in the range from 0.1 to 30 mol-ppm, based on the total monomers to be polymerized. Suitable solvents for the initiators are aliphatic hydrocarbons, such as octane or gasoline. However, other inert solvents, such as chlorobenzene, cyclohexane or methanol, may also be used.

The usual regulators, for example hydrocarbons, such as propane, propene, isooctane; ketones, such as acetone, ethyl methyl ketone; aldehydes, such as propionaldehyde, also have a regulating effect in the process according to the invention. Accordingly, it is preferred not to add regulators such as these. If their use is unavoidable, for example as solvent for the initiator or for the cleaning of stirrer shafts, the regulating effect of these compounds can be compensated by increasing the quantity in which the (meth)acryloyl compounds to be used in accordance with the invention or typical crosslinking agents are used.

The copolymer prepared in accordance with the invention may be worked up, for example, as follows:

On completion of polymerization, the reaction mixture is introduced into a high-pressure product separating zone in which a pressure of from 100 to 500 bar and a temperature in the range from 150° to 300° C. prevails. The copolymer present in the reactor is separated off from unpolymerized monomers in this high-pressure product separator. The copolymer is passed from the high-pressure product separator into a low-pressure product separating zone in which a pressure below 10 bar prevails.

The product obtained is removed from the low-pressure product separator by a discharge unit, cooled and granulated. It is preferred to use an underwater granulator, the water used optionally containing additives for further reducing the tackiness of the granulates.

The copolymers produced in accordance with the invention preferably have gel contents below 0.5% by weight and preferably below 0.2% by weight, based on copolymer and determined as insoluble residue after extraction for 24 hours with tert.-butanol in a Soxhlet apparatus. Qualitatively, the presence of gel components can be recognized very easily in the form of surface roughness of extruded copolymer strands 2 to 5 mm in diameter.

The melt flow index (MFI) of the copolymers produced in accordance with the invention is generally below 100 g/10 mins (as measured at 190° C./2.16 kp). Their molecular weights, determined as number averages $\overline{M}_n$, are in the range from 15,000 to 200,000 and preferably in the range from 22,000 to 70,000 (as determined by membrane osmometry in toluene); their Mooney viscosities according to DIN 53 523 are generally below 50 ML (1+4) 100° C.

The copolymers produced in accordance with the invention may be used both in non-vulcanized form and in vulcanized form. Preferred examples of their use in nonvulcanized form are as flow promoters for lubricants and hydraulic oils (such as, for example, middle distillates according to DIN 7728 T1), as adhesive binders, more especially for hotmelt adhesives, and as a (plasticizing) mixture component for thermoplastics, duroplastics and rubbers. The quantities used depend upon the particular application envisaged. Thus, flow promoters may contain quantities of more than 1% by weight and hotmelts quantities of up to 100% by weight of the copolymers produced in accordance with the invention.

Suitable thermoplastics and duroplastics include, for example, PVC, polymethyl methacrylate, styrene and acrylonitrile copolymers, including ABS, polyvinylidene chloride, polyesters, including polycarbonates, polyamides, polyvinyl acetates, polyphenylene sulfide, polyethylene and thermoplastic polyesters, such as polyalkylene terephthalates; unsaturated polyester resins, phenol/formaldehyde and amine/formaldehyde condensates.

For most spplications, the copolymers produced in form. Vulcanization may be carried out—optionally after the addition of fillers, stabilizers, etc.—by crosslinking with peroxides. Peroxides can be used in combination with polyfunctional crosslinking compounds such as, for example, triallyl cyanurate, trisllyl isocyanurate, bis-maleic imides or divinyl benzene.

Copolymers produced in accordance with the invention which, in addition to ethylene and vinyl acetate units, contain copolymerized residues of the comonomers containing reactive groups described further above may be crosslinked with other crosslinking chemicals. Suitable methods for this purpose include salt vulcanization with metal oxides or metal peroxides such as zinc oxide, zin peroxide, magnesium oxide, calcium oxide for polymers containing carboxyl groups; crosslinking with diamines or disulfides for epoxide-containing and anhydride-containing polymers; crosslinking with diisocyanates for polymers containing hydroxyl groups; crosslinking with elemental sulfur or sulfur donors for polymers containing double bonds and chlorine or for polymers containing incorporated carbon monoxide. In addition to the crosslinking reactions mentioned, vulcanization reactions such as, for example, resin vulcanization or crosslinking with quinones are also suitable.

In the context of the invention, "vulcanized" means that, during extraction for 10 hours in a Soxhlet apparatus using toluene as extractant, less than 5% by weight and preferably less than 3% by weight, based on copolymer, is extractable.

One important use of vulcanizates of copolymers produced in accordance with the invention is as a mixture component for other rubbers such as, for example, rubber-like homopolymers and copolymers of butadiene, isoprene, chloroprene, acrylonitrile, vinyl acetate, esters of acrylic or methacrylic acid with $C_1$-$C_8$ monoalcohols and dialcohols; vinyl chloride, ethylene.

For these purposes, the copolymers produced in accordance with the invention may be used in quantities variable within wide limits of, for example, from 1 to 99% by weight, preferably from 10 to 90% by weight and more preferably from 10 to 40 and from 60 to 90% by weight, based on the mixture.

The copolymers may be added in already vulcanized form although, in most cases, the copolymers will be added in non-vulcanized form to the non-vulcanized rubbers and the two then vulcanized together.

This last embodiment may also be applied to mixtures with thermoplastics, for example with ethylene/vinyl acetate copolymers containing from 1 to less than 30% by weight VA.

These vulcanized copolymers produced in accordance with the invention may be used as such or in the form of the above-described mixtures for the production of moldings, films and coatings of all kinds, for example for the production of cable sheaths and conductive layers, seals, hoses, conveyor belts, power transmission elements, such as gear belts and V-belts, and also insulating materials for noise insulation and vibration damping.

EXAMPLES

The tests were carried out in a continuous-flow, 700 ml high-pressure stirred autoclave (no stuffing boxes) with ideal back-mixing. Tert.-butyl perisooctanoate was used as initiator. The dosage was selected so that the reaction temperature could be kept constant at 160° C. for a monomer throughput of 25 kg/h. The polymerization conversions in the individual tests were between 14 and 16%. The residence times were 1 minute. In all tests, the pressure was kept constant (1850 bar).

The following Table shows the effect of methacrylic anhydride (MASA) on the tackiness of the copolymers obtained for various vinyl acetate contents (VA). The tackiness was quantified on a scale of 0 to 5 in which 0=substantially non-tacky and 5=exceptionally tacky.

|  | Example | | | | | | | | |
|---|---|---|---|---|---|---|---|---|---|
|  | 1 | V1 | 2 | V2 | 3 | 4 | V4 | 5 | V5 |
| VA (% by weight) | 30 | 30 | 40 | 40 | 40 | 40 | 40 | 70 | 70 |
| MASA (ppm) | 510 | — | 420 | — | 630 | 830 | 830 | 530 | — |
| Regulator, i-octane (ppm) | — | — | — | — | — | 400 | — | — | — |
| MFI (g/10 mins) at 2.16 kp/190° C. | 0.5 | 130 | 46 | >200 | 0.62 | 8 | <0.1 | 60 | >>200 |
| Tackiness | 0 | 3 | 2 | 4 | 0 | 1 | 0 | 2 | 5 |
| Gel-containing | No | No | No | No | No | No | Yes | No | No |

We claim:

1. Ethylene/vinyl acetate copolymers having a gel content of not more than 0.5% by weight (determined by 24 hours extraction with dichloromethane in a Soxhlet extractor) and containing from 30 to 80% by weight copolymerized vinyl acetate and 50 ppm to 2% by weight of a copolymerized (meth)acryloyl compound containing at least two acryloyl or methacryloyl groups per molecule produced by bulk polymerization of the monomers by the high-pressure method under pressures of 500 to 5,000 bar wherein the polymerization is carried out in the presence of from 50 ppm to 2% by weight, based on the polymerization monomers used, of a (meth)acryloyl compound containing at least two acryloyl or methacryloyl groups per molecule.

2. Ethylene/vinyl acetate copolymers according to claim 1 having a gel content of not more than 0.2% by weight.